United States Patent [19]
Penrod

[11] 3,870,454
[45] Mar. 11, 1975

[54] COOLED DECKLE FOR DIE STRUCTURE

[75] Inventor: William R. Penrod, Rockton, Ill.

[73] Assignee: Beloit Corporation, Beloit, Wis.

[22] Filed: Feb. 1, 1973

[21] Appl. No.: 328,517

[52] U.S. Cl.................................. 425/466, 425/378
[51] Int. Cl. ............................ B29f 3/04, B29f 3/08
[58] Field of Search ........... 425/380, 381, 461, 466, 425/378; 264/176 R

[56] References Cited
UNITED STATES PATENTS

| | | | |
|---|---|---|---|
| 3,032,817 | 5/1962 | Czerkas | 425/461 X |
| 3,132,377 | 5/1964 | Allenbaugh et al | 425/466 |
| 3,611,491 | 10/1971 | Rector | 425/380 |
| 3,684,422 | 8/1972 | Huesing | 425/461 X |

*Primary Examiner*—Francis S. Husar
*Attorney, Agent, or Firm*—Dirk J. Veneman; Bruce L. Samlan; Gerald A. Mathews

[57] ABSTRACT

A deckle structure for an extrusion die including a cooling supply tube having a fin projecting therefrom and in heat transfer relation therewith. The fin projects into the outlet slot of the die. Upon the distribution of cooling fluid through the supply tube, the fin is cooled thereby reducing the temperature of the plastic in contact therewith. The cooling of the plastic increases the viscosity of the plastic which in cooperation with the fin seals the blocked portion of the outlet slot.

8 Claims, 2 Drawing Figures

COOLED DECKLE FOR DIE STRUCTURE

BACKGROUND OF THE INVENTION

This invention relates generally to die structures for extruding plastic materials therefrom and more specifically to deckle means associated with the outlet slot for adjustably controlling the width of the plastic extruded from the die.

Presently it is extremely difficult to properly regulate the width of the plastic film or sheet extruded from the die. The deckle means are operating in a very hostile environment of high temperature and high pressure. Furthermore, since the die is usually closely adjacent to ancillary take-off equipment, any external deckle structure is under severe space limitations so as not to increase the distance between the plastic film leaving the die and the ancillary take-off equipment.

Correspondingly, then, it has been difficult to find a deckle structure which is reliable in sealing the blocked off portion of the die structure, is compact, and furthermore, has the required adjustability for changing the width of the die outlet.

External boat deckles have been used of the type shown in U.S. Pat. No. 3,293,689 and internal rod deckles have been used of the type shown in U.S. Pat. No. 2,982,995. Combinations of internal and external deckles have been utilized as disclosed in U.S. Pat. No. 3,694,132 and combination of internal deckles have also been utilized. These type of deckle structures have met with partial success. However, there generally is leakage affiliated therewith and it has been rather difficult to achieve proper adjustability. These deckle structures are generally expensive to manufacture and install, and once an operating problem exists in the field, a serious and expensive corrective problem results.

What is desired then is a deckle structure for a die which will seal the outlet slot to prevent leakage therefrom, which deckle structure will be more reliable than those presently available. It is also desirable that the deckle structure be easily adjustable, inexpensive to manufacture, and relatively compact.

SUMMARY OF THE INVENTION

The present invention relates to a die structure for extruding plastic materials and more specifically to deckle means for adjustably regulating the width of the outlet slot of the die. The deckle structure is comprised of a cooling supply tube including an inner conduit member disposed concentrically within an outer conduit member. A fin structure with high heat conductivity is firmly fastened to the outer conduit member. The fin structure projects into the outlet slot of the die structure, one deckle structure corresponding to each side of the die. The combination of the fin and cooling supply tube is supported from the die structure in any suitable manner.

Cooling fluid enters the inner conduit member and flows through into the outer conduit member or vice versa. The fluid then flows through the outer conduit member thereby cooling the fin structure. By cooling the fin, the highly fluid plastic in contact therewith quickly cools and increases the viscosity of the plastic thereby partially solidifies the plastic in close proximity to the fin.

The combination of the fin extending into the outlet slot and the highly viscous plastic encompassing the fin forms a seal structure which prevents leakage of the plastic at the deckled portion of the die. The deckle structure is easily movable since the plastic is not completely solidified at the cooled fin portion. The resulting deckle structure is relatively inexpensive to manufacture since the tolerances are greatly increased and it is compact in design.

DESCRIPTION OF THE PREFERRED EMBODIMENT

Figure 1:
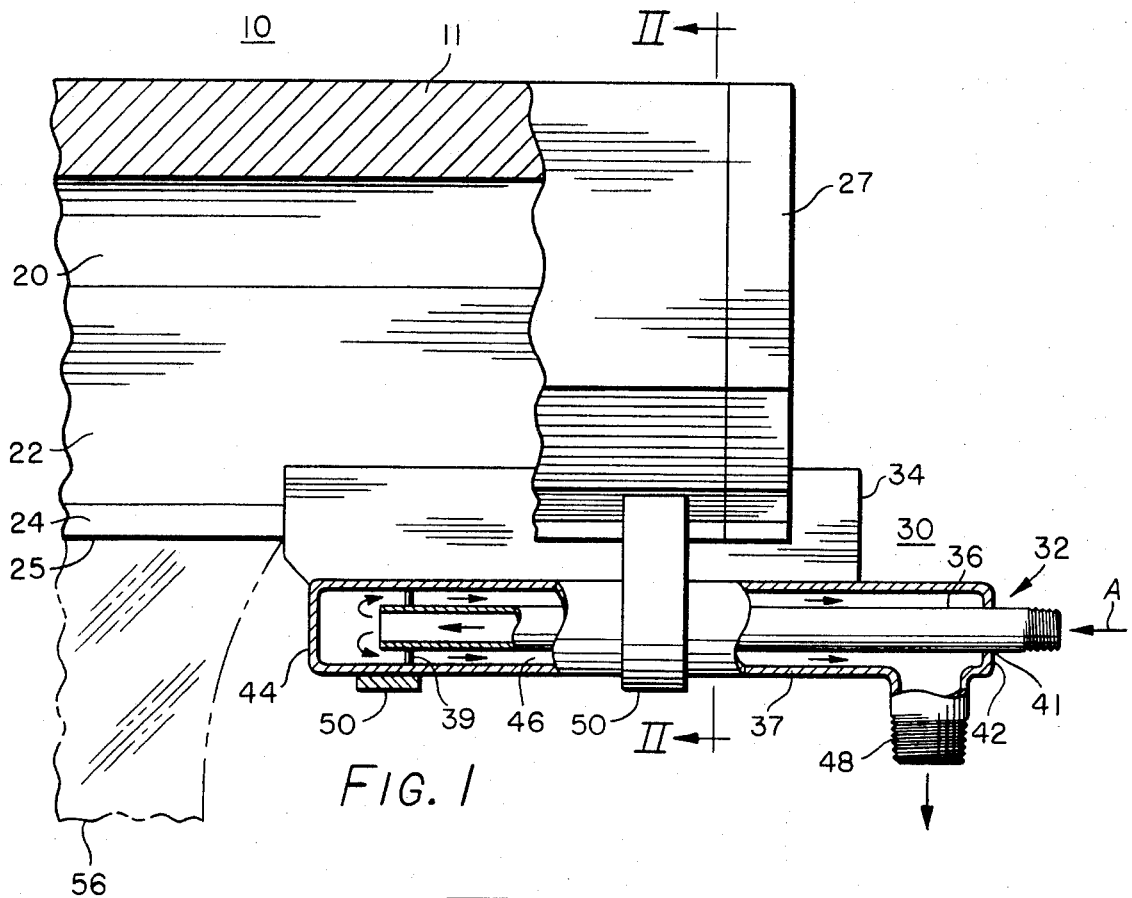
FIG. 1 is a longitudinal view partially in section of a portion of a die and deckle structure constructed in accordance with this invention.
Figure 2:
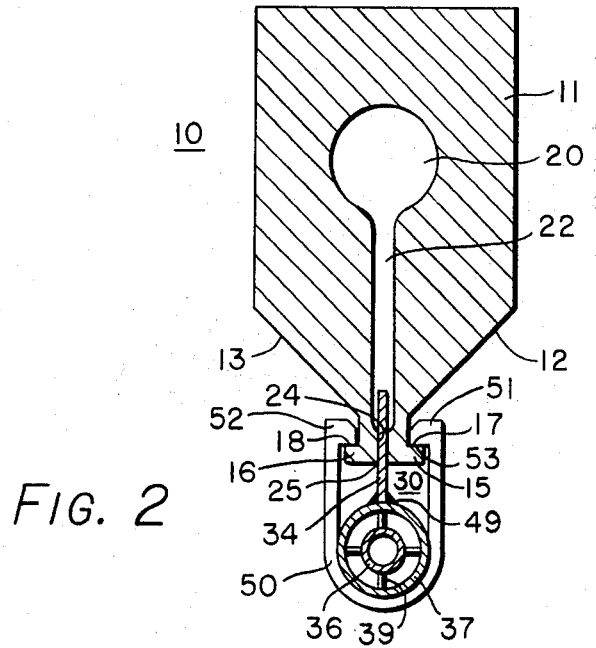
FIG. 2 is a view taken substantially along line II—II in FIG. 1.

Referring to FIGS. 1 and 2 of the drawings, what is disclosed is a portion of a typical die 10 for extruding a plastic film or sheet. Other types of dies may be used as for example, a dual slot die of the type shown in U.S. Pat. No. 3,797,987. The die 10 includes a die body 11 which is generally rectangular in cross section. The bottom portion of the die body 11 tapers inwardly to form walls 12 and 13. At the bottom portion of the die body 11 are a pair of flanged portions 15 and 16 which extend horizontally outward in a direction transverse to the die. Each flange portion 15, 16 has a corresponding upper surface 17, 18, said upper surfaces extending along the full longitudinal length of the die body 11.

The die body 11 defines a manifold 20 for receiving plastic melt from an extruder or other known plastic melt means (not shown). The manifold 20 extends along the full longitudinal length of the die body 11.

A passageway 22 defined within the die body 11, is disposed vertically below manifold 20 and in fluid communication therewith. The passageway 22 extends downwardly in a machine direction and extends longitudinally along the full length of the die body 11.

A final land area 24 is defined in die body 11 and is disposed vertically below passageway 22 and extends downwardly in a machine direction. The final land area is in fluid communication with the passageway 22 and manifold 20 and the end thereof defines the outlet slot 25. A pair of end plates 27 (only one being shown) block the manifold 20, passageway 22, and final land area 24 on each end of the die. It is appreciated that the die 10 need not be disposed vertically as shown, but may be, for example be disposed on its side.

The deckle structure 30 includes a cooling supply means 32 and a heat transfer fin structure 34. The cooling supply means 32 includes an inner conduit 36 and an outer conduit 37. The inner conduit 36 is concentrically disposed within the outer conduit 37 and may be supported by any suitable means such as radially extending spider portions 39. In certain instances the inner conduit 36 may rest on the bottom of outer conduit 37. The inner conduit 36 extends into the outer conduit 37 through the inlet or opening 41 in one end wall 42 of the outer conduit. This inlet portion of the inner conduit 36 is supported by the end wall 42. The outlet of the inner conduit 36 is in spaced relation with the end wall 44 of the outer conduit 37. As previously described, the inner conduit 36 is in spaced relation with the outer conduit 37 and cooperatively therewith defines an annular return passageway 46. A downwardly extending outward portion 48 transverse to outer conduit 37 is fastened immediately adjacent to the end wall 42 of the outer conduit and is in fluid communication with passageway 46.

A vertically extending fin 34 is secured to the top portion of the outer conduit 37 by any suitable means such as welds 49. The fin is preferably made of a metal with a high heat conductivity. The fin 34 projects vertically upwards into the final land area 24 and beyond into the passageway 22. The fin 34 may for better heat transfer effectiveness be extended through the outer conduit 37 and be in contact with the inner conduit 36.

A pair of U-Shaped body members 50 encompass the deckle structure 30. The body member 50 has inwardly extending flange portions 51. The bottom surface 53 of the flange portions 51 and 52 slidably engage the upper surfaces 17 and 18 of the inwardly extending flange portions 15, 16 of the die.

In operation, plastic sheet 56 is extruded from the die 10. The deckle structure 30 is moved to a position, as for example that shown in FIG. 1, to regulate the width of the web in a longitudinal direction, one deckle structure being shown but preferably there would be another deckle structure on the other side of the die. Cooling fluid, as for example ordinary tap water, is supplied by any suitable means (not shown) to the inner conduit 36 as indicated by the arrow A, although it will be appreciated that the cooling fluid can be supplied to the outer conduit 37. The cooling fluid flows through conduit 36 and exits into outer conduit 37. The fluid then flows through the return passageway 46 to the outlet portion 48. The temperature of the cooling fluid and the rate of flow through the conduits 36, 37 are two factors in determining the heat transfer effectiveness of the deckle 30.

The cooling fluid cools the fin 34, thereby reducing the temperature of the plastic in a close proximity thereto. Upon reduction of the temperature of the plastic, the viscosity of the plastic increases and in cooperation with the fin 34 seals the final land portion 24. This blocks the portion of the outlet slot 25 and very effectively controls the width of the film 56 leaving the outlet slot 25.

An additional and unexpected advantage of the cooled deckle structure 30 is the relative ease of movement thereof relative to the die 10. While the plastic adjacent the fin 34 increases in viscosity, it reduces substantially the pressure on the whole deckle system. It is furthermore theorized that the plastic is still not completely solidified and therefore responds to movement in a longitudinal direction of the deckle structure 30.

The above deckle structure thereby has superior sealability properties, when compared to present deckles. Furthermore, it is easily adjustable, relatively inexpensive to manufacture because of a decrease in tolerance required, and is relatively compact in design.

While only one embodiment of the invention has been described, it will be obvious to those skilled in the art that many modifications and improvements can be made within the scope of the invention, and that all matter contained in the description or shown in the drawings shall be interpreted as illustrative only and not in a limiting sense. For example, the cooled deckle structure is applicable to external deckles, internal deckles and combinations thereof as previously described.

What is claimed is:

1. In a die structure having an outlet slot for extruding plastic therethrough, deckle means for controlling the width of plastic exiting from said slot, said deckle means comprising:
    a deckle member associated with said die structure to block a portion of said outlet slot,
    means to cool said deckle member, including means for bringing a cooling fluid into thermal contact with said deckle member to increase the viscosity of the plastic to prevent leakage through the blocked portion of the die.

2. The structure recited in claim 1 and further including at least one supporting member positioning said deckle structure relative to said die.

3. The structure recited in claim 2 wherein said supporting member cooperates with the die structure to support said deckle structure.

4. The structure recited in claim 3 wherein the support structure slideably moves along corresponding portions on the die structure.

5. In a die structure having an outlet slot for extruding plastic therethrough, deckle means for controlling the width of plastic exiting from said slot, said deckle means comprising:
    a deckle member associated with said die structure to block a portion of said outlet slot,
    means to cool said deckle member, said cooling means increasing the viscosity of the plastic in close proximity to said deckle member thereby diminuting leakage of plastic through said blocked portion of said die,
    said die structure defining a manifold for receiving plasticized melt, a passageway extending from said manifold and in fluid communication therewith, a final land area extending from said passageway and in fluid communication therewith,
    said deckle structure including a cooling fluid supply member and a cooling fin member in heat transfer relation thereto,
    said cooling member extending into said final land portion and cooperating therewith to cool the plasticized melt and seal the final land portion.

6. The structure recited in claim 5 wherein the cooling fluid supply member includes an outer conduit structure and an inner conduit structure disposed therein, said cooling fluid entering the inner conduit structure and flowing therethrough into the outer conduit structure, said cooling fluid leaving said outer conduit structure to cool the same.

7. In a die structure having an outlet slot for extruding plastic therethrough, deckle means for controlling the width of plastic exiting from said slot, said deckle means comprising:
    a deckle member associated with said die structure to block a portion of said outlet slot,
    means to cool said deckle member, said cooling means increasing the viscosity of the plastic in close proximity to said deckle member thereby diminuting leakage of plastic through said blocked portion of said die,
    said deckle means including an outer conduit structure and an inner conduit structure, said inner conduit structure being disposed within said outer conduit structure, and fluid means entering one of said conduit structures and exiting through the other of said conduit structures.

8. In a die structure having an outlet slot for extruding plastic therethrough, deckle means for controlling the width of plastic exiting from said slot, said deckle means comprising:
- a deckle member associated with said die structure to block a portion of said outlet slot,
- means to cool said deckle member, said cooling means increasing the viscosity of the plastic in close proximity to said deckle member thereby diminuting leakage of plastic through said blocked portion of said die,
- said deckle member comprising an inner and outer conduit structure for delivery of cooled fluid thereto, and a fin structure in heat transfer relation with the conduit structures, said fin structure cooling the plasticized material within the die.

* * * * *